(12) United States Patent
Ganzenmuller, V

(10) Patent No.: US 7,480,957 B2
(45) Date of Patent: Jan. 27, 2009

(54) IN-VEHICLE VACUUM SYSTEM

(76) Inventor: William Ganzenmuller, V, 102 Commonwealth Ave., Chesapeake, VA (US) 23325

( * ) Notice: Subject to any disclaimer, the term of this patent is extended or adjusted under 35 U.S.C. 154(b) by 615 days.

(21) Appl. No.: 10/913,394

(22) Filed: Aug. 9, 2004

(65) Prior Publication Data

US 2005/0066468 A1 Mar. 31, 2005

Related U.S. Application Data

(63) Continuation-in-part of application No. 10/279,112, filed on Oct. 24, 2002, now Pat. No. 6,813,805, which is a continuation of application No. 09/955,590, filed on Sep. 17, 2001, now Pat. No. 6,490,751.

(60) Provisional application No. 60/233,100, filed on Sep. 15, 2000.

(51) Int. Cl.
*A47L 5/38* (2006.01)
(52) U.S. Cl. .......................... 15/313; 15/330
(58) Field of Classification Search .................. 15/313, 15/330, 339, 405; *A47L 5/35, 5/38; B60S 1/64*
See application file for complete search history.

(56) References Cited

U.S. PATENT DOCUMENTS

| 3,431,581 | A | * | 3/1969 | Booth | 15/313 |
| 5,829,091 | A | * | 11/1998 | Ingram et al. | 15/313 |
| 2003/0140443 | A1 | * | 7/2003 | Najm et al. | 15/313 |
| 2004/0107528 | A1 | * | 6/2004 | LeClear et al. | 15/313 |
| 2004/0134013 | A1 | * | 7/2004 | Slone | 15/313 |
| 2005/0011035 | A1 | * | 1/2005 | Rukavina et al. | 15/313 |

* cited by examiner

*Primary Examiner*—David A Redding

(57) ABSTRACT

A direct port vacuum cleaning system comprises a vacuum cleaner housing including a vacuum generating unit having a blower within a blower housing, and a debris canister housing detachably directly connected to the blower housing providing a defined path for a flow of air through the system. The debris canister housing has an air input and outlet directing the flow of air along the defined path into the debris canister housing, out the canister air outlet, and directly into the blower housing when the canister air outlet is connected directly to the air inlet of the blower housing. The vacuum cleaner housing is shaped for disposition between the outer shell of a vehicle body and an inner surface panel inside a vehicle; or within the back cushion of a seat within the vehicle; or within a cabinet located between two laterally spaced, side-by-side seats in a vehicle.

12 Claims, 7 Drawing Sheets

IN-VEHICLE VACUUM SYSTEM

CLAIM OF BENEFIT OF NON-PROVISIONAL APPLICATION

This is a continuation-in-part application of application Ser. No. 10/279,112 filed Oct. 24, 2002, now U.S. Pat. No. 6,813,805 from which it claims benefit of priority pursuant to 35 U.S.C. § 120. Application Ser. No. 10/279,112 filed Oct. 24, 2002, which is now allowed, is a continuation of U.S. application Ser. No. 09/955,590 filed Sep. 17, 2001. Pursuant to 35 U.S.C. § 119, the benefit of priority from U.S. provisional application Ser. No. 60/233,100 filed Sep. 15, 2000 is claimed for the U.S. non-provisional application Ser. No. 09/955,590 filed Sep. 17, 2001, which is now U.S. Pat. No. 6,490,751 issued Dec. 10, 2002.

BACKGROUND OF THE INVENTION

1. Field of the Invention

The present invention relates to a vacuum cleaning system and more particularly pertains to a direct port vacuum cleaning system for use in a motor vehicle anytime or anywhere.

2. Description of the Prior Art

The use of vacuum cleaning systems is known in the prior art. Various vacuum cleaning systems are described in U.S. Pat Nos. 5,829,091; 5,189,753; 4,829,626; 5,274,878; 5,239,727;and 4,991,253. While these devices fulfill their respective particular objectives and requirements, the aforementioned patents do not disclose an in-vehicle, direct port vacuum cleaning system. Particularly, U.S. Pat. No. 5,829,091 describes a central vacuum cleaning system that requires a vacuum port including a vacuum line located within the panels of the automobile. The vacuum line is difficult to assemble and replace. It is also decreases the suction power of the vacuum. The present device comprises a direct port vacuum that does not require a vacuum tube throughout the vehicle. Therefore, it is easily installed and readily removed.

In these respects, the in-vehicle, direct port vacuum system according to the present invention substantially departs from the conventional concepts and designs of the existing art. And in so doing provides an apparatus primarily developed for the purpose of providing the opportunity to vacuum a vehicle such as an automobile anytime or anywhere.

PURPOSE OF THE INVENTION

An object of the present invention is to provide an in-vehicle, direct port vacuum cleaning system that has many of the advantages of the vacuum cleaning systems mentioned heretofore, and includes many novel features that result in a system that is not anticipated, rendered obvious, suggested, or even implied by any of the prior art vacuum cleaning systems either alone or in any combination thereof.

Another object of the present invention is to provide an in-vehicle, direct port vacuum cleaning system that may be easily and efficiently installed and removed.

Still another object of the present invention is to provide an in-vehicle, direct port vacuum cleaning system having a direct port vacuum cleaner hose and a vacuum generating unit encased in a housing so that the cleaning system does not require a vacuum line throughout the vehicle.

Still another object of the present invention is to provide an in-vehicle, direct port vacuum cleaning system having a direct port vacuum cleaner hose and a vacuum generating unit encased in a housing so that the cleaning system does not require a vacuum line throughout the vehicle.

Yet another object of the present invention is to provide an in-vehicle, direct port vacuum cleaning system that can be used to blow dry hair, inflate flat tires, blow off debris from the driveway and the like.

Yet another object of the present invention is to provide an in-vehicle, direct port vacuum cleaning system that is powered by the vehicle's battery via power inversion means.

SUMMARY OF THE INVENTION

In view of the foregoing purposes, and disadvantages inherent in the known types of vacuum cleaning systems, the instant invention provides an in-vehicle, direct port vacuum cleaning system that is operated from a vehicle battery and can be used while the vehicle is in use.

The present invention generally comprises a direct port vacuum cleaner hose encased in a housing that is designed to fit in selected locations in a vehicle. The vacuum generating unit is powered by the vehicle's battery via power inversion means, and runs on 110 volts of power.

It is to be understood that the invention is not limited in its application of the details of construction and/or to the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

The invention will be better understood, and objects other than those set forth above will become apparent when consideration is given to the following detailed description thereof. Such description makes reference to the annexed drawings wherein.

Figure 1:
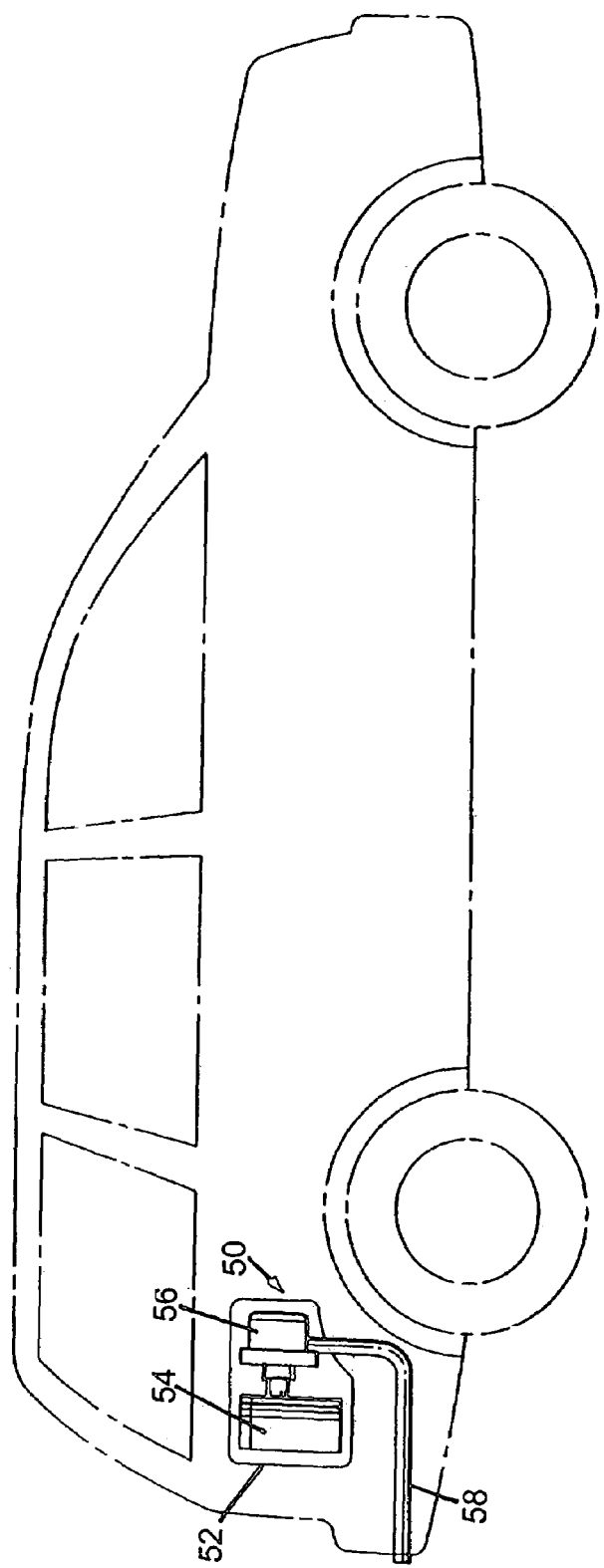
FIG. 1 is a side elevational view from outside the vehicle of a vacuum generating unit of the invention, partially-in-section, disposed in a rear side compartment of a vehicle.

As shown in the drawings, the invention is directed to an in-vehicle, direct port vacuum cleaning system having a direct port vacuum cleaner hose and a vacuum generating unit encased in a housing having a structural configuration to fit in selected locations in a vehicle so that the cleaning system does not require a vacuum line throughout the vehicle.

DESCRIPTION OF THE SPECIFIC EMBODIMENTS

As shown in the drawings. the invention is directed to an in-vehicle, direct port vacuum cleaning system having a direct port vacuum cleaner hose and a vacuum generating unit encased in a housing having a structural configuration to fit in selected locations in a vehicle so that the cleaning system does not require a vacuum line throughout the vehicle.

Figure 2:
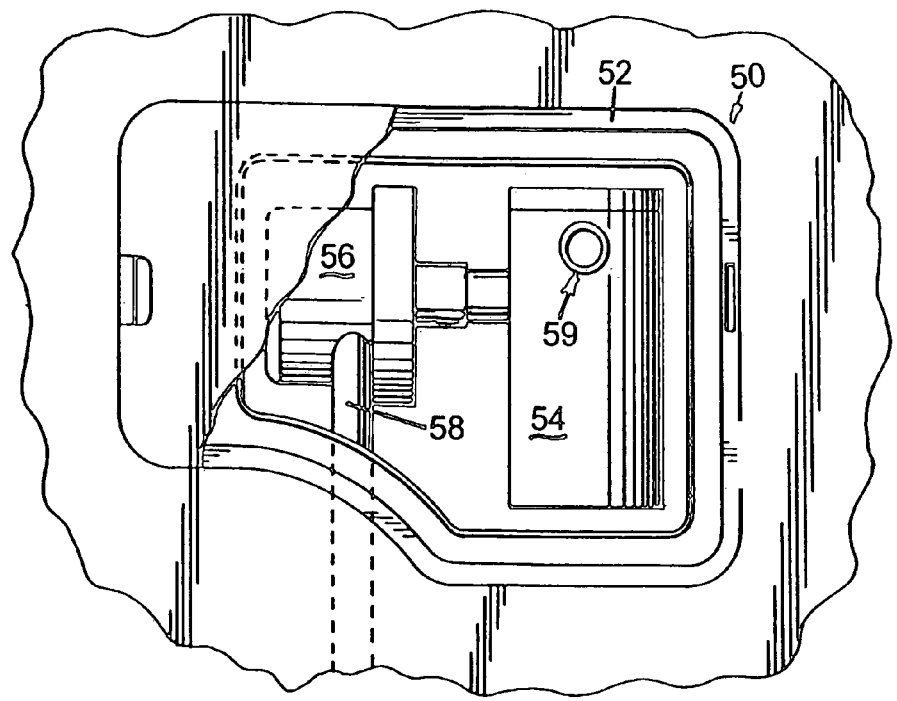
FIG. 2 is a fragmentary side elevational view from inside the vehicle of the vacuum generating unit of FIG. 1 showing a portion of the inner surface panel of the vehicle cut-away.

The present invention shown in FIGS. 1 and 2 comprises a vacuum generating unit, generally designated 50, mounted within the rear surface panel compartment of a vehicle. Unit 50 includes a vacuum cleaner housing 52 molded to removably receive debris canister 54 and motor-blower 56, and mounted between the outer shell of the vehicle body and an inner surface panel inside the vehicle. Canister 54 removably located within housing 52 is removably attached to motor-blower 56 that blows air out exhaust tube 58. A vacuum cleaner hose (FIG. 8) is attached to canister input 59 where debris enters canister 54, dumps the debris, and the air, freed of the debris, exhausts out unit 50 via exhaust tube 58. Exhaust tube 58 and vacuum cleaner housing 52, containing canister 54 and motor-blower 56, are supported within the space between the vehicle body's outer shell and the inner side surface panel in a known manner as with audio speakers.

Figure 3:
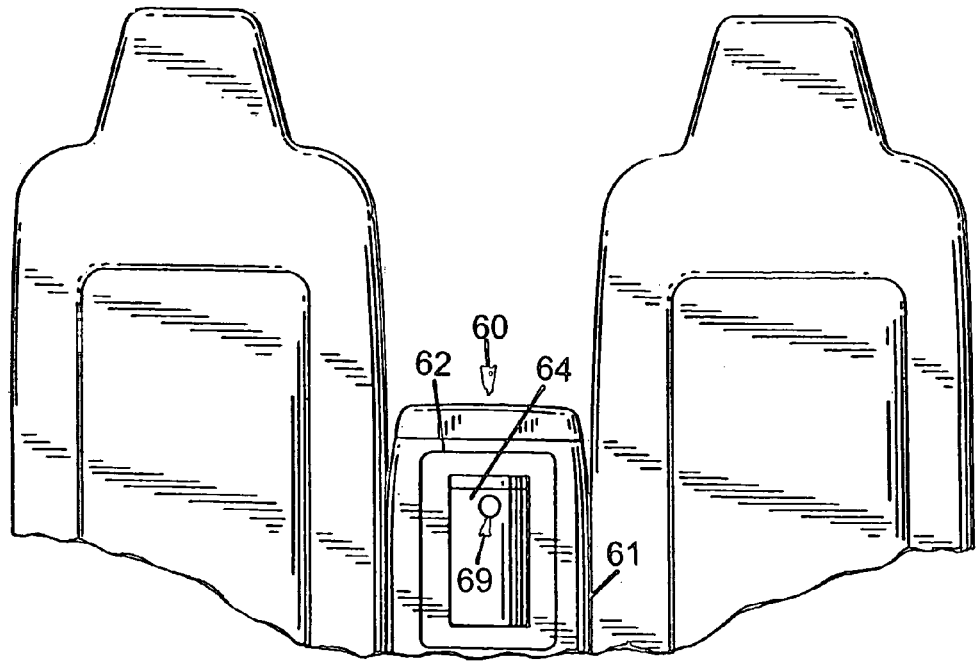
FIG. 3 is a fragmentary front end elevational view of a vacuum generating unit of the invention disposed in a cabinet that is located between two individual bucket seats of a vehicle.

The embodiment of FIG. 3 comprises a vacuum generating unit, generally designated 60, mounted within cabinet 61 that is disposed between two laterally spaced, side-by-side bucket seats of a vehicle as shown. Vacuum cleaner housing 62 is shaped to fit inside cabinet 61 with canister input means 69 of debris canister 64 located in housing 62 to be attached to a vacuum hose on the front side of the cabinet. The exhaust port (not shown) attached to motor-blower (not shown) can be directed downwardly out the floor or through the rear of the vehicle in a known manner. The exhaust port may be directed inside the vehicle for other uses as discussed herein.

Figure 4:
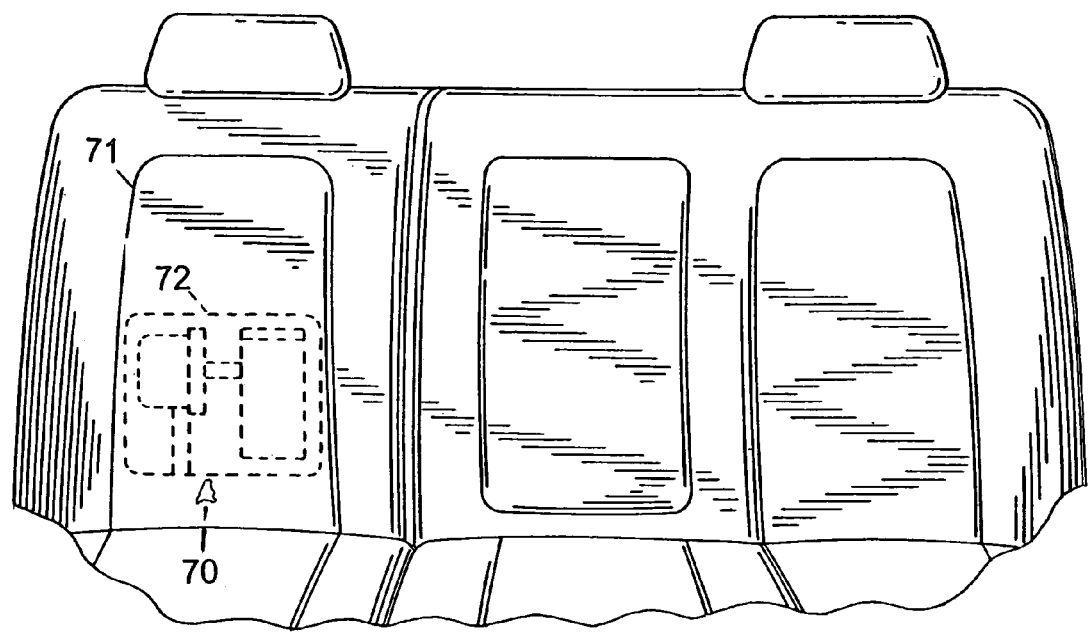
FIG. 4 is a fragmentary side elevational view of a vacuum generating unit of the invention disposed in a back cushion that is located either in the front or rear of a vehicle.
Figure 5:
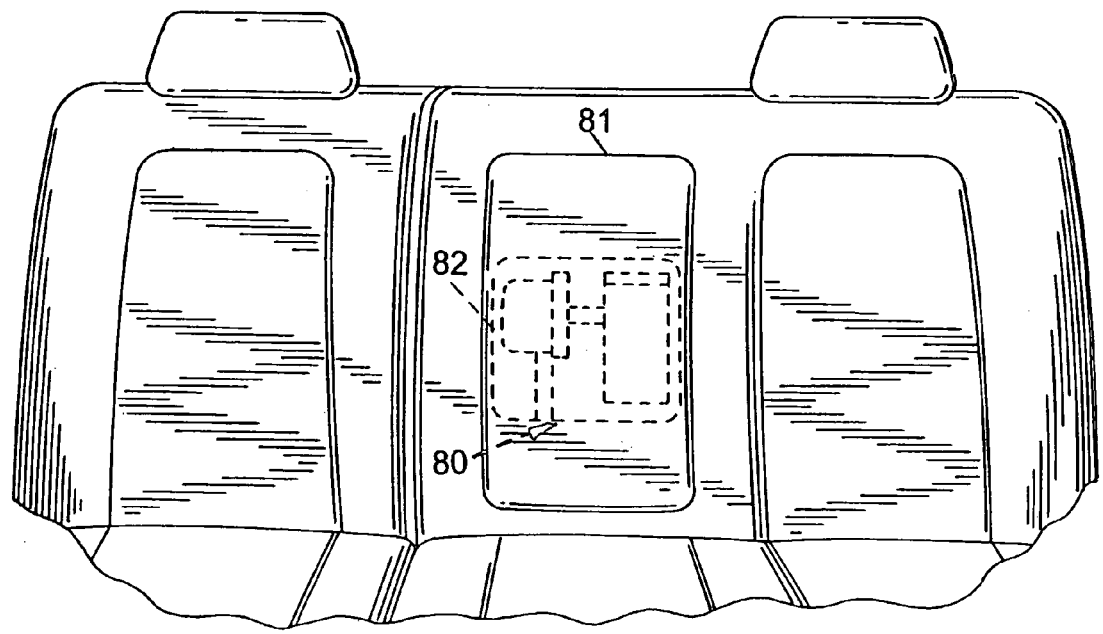
FIG. 5 is a fragmentary end elevational view of a vacuum generating unit of the invention disposed in a center back cushion that is located in a vehicle.

The embodiments shown in FIGS. 4 and 5 comprise respective vacuum generating units, generally designated 70 and 80, mounted within back cushions in the rear of a vehicle. Each unit 70 and 80 are covered by a respective panel 71 and 81 that folds down to reveal vacuum cleaner housings 72 and 82 that contain respective vacuum generating units 70 and 80 as shown. Respective exhaust tubes shown may be directed outside or inside the vehicle to make use of the debris-free air. The embodiments of generating units 60, 70, and 80 are of the type shown in generating unit 50 with the debris canister in each instance removably attached to the respective blower.

Figure 6:
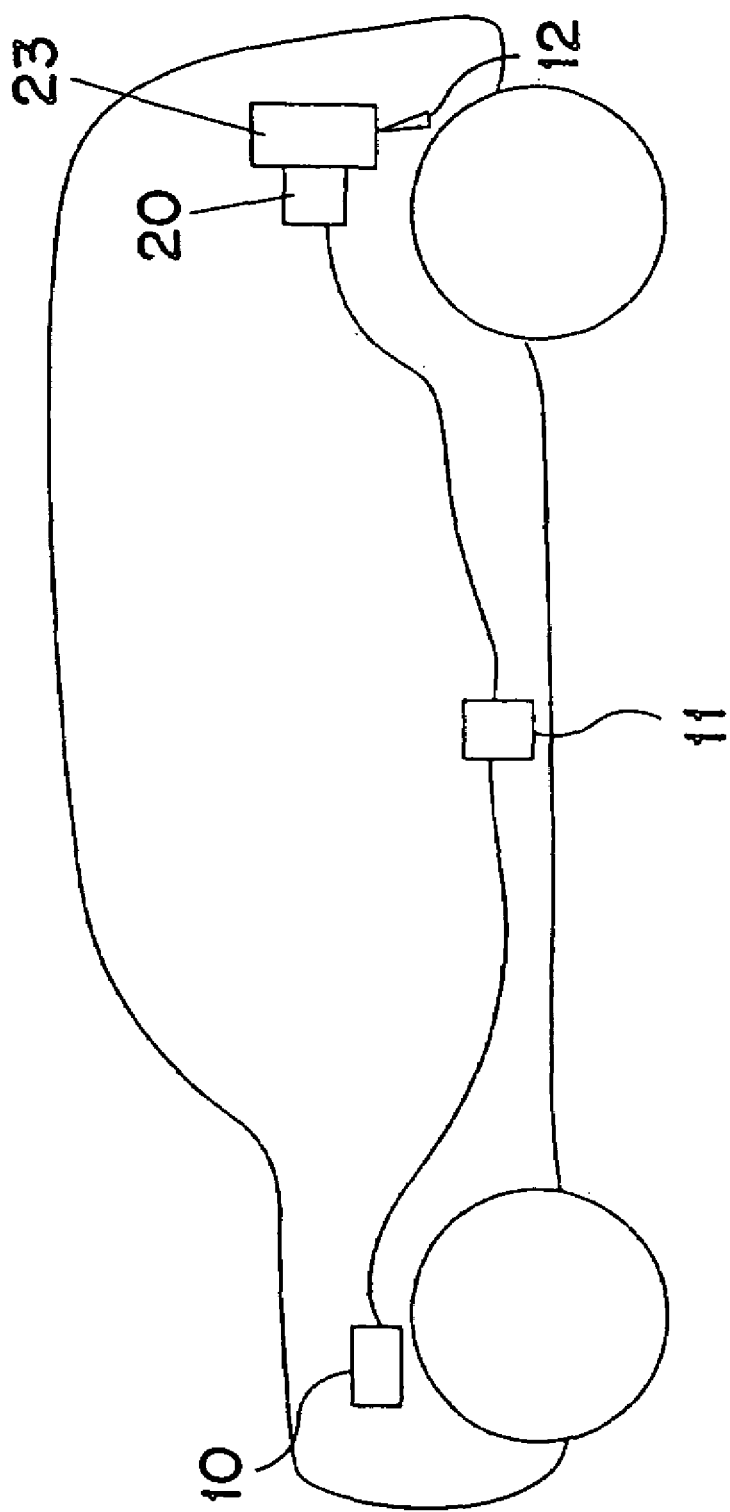
FIG. 6 is a side view of an in-vehicle, direct port vacuum cleaning system installed in a vehicle according to the present invention.

Referring to FIG. 6, vacuum generating unit 12 is powered by the vehicle's battery 10. The battery's power is converted from DC to AC by power inversion means 11. Power inversion means 11 include, but is not limited to, a power inverter, a computer chip, a fuse, or a fusible link. In a specific embodiment, the vacuum generating unit's electric motor 25 is run on 110 volt power. Power is controlled by a remote power switch located conveniently within the vehicle. Wiring connects power inversion means 11 to generating unit 12 for supplying zero to approximately 1,000 watts of power to the system. In addition to the system operating while the vehicle engine is running, it can operate after the engine has been turned off. In a specific embodiment, an indicator light notifies the user that it is time to start the vehicle. Also, if the power source is draining too much power, the system automatically shuts down to let the user know to start the engine.

Figure 7:
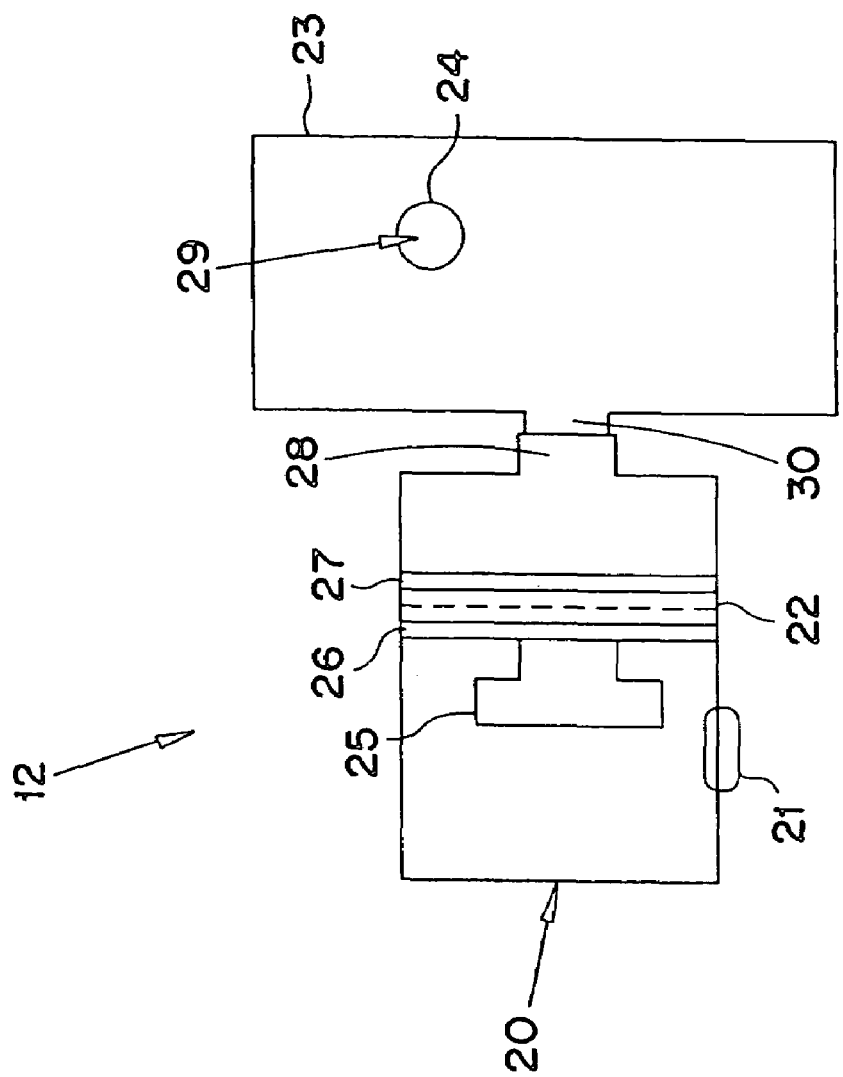
FIG. 7 is an enlarged detail of the front side of a vacuum generating unit of the invention.
Figure 8:
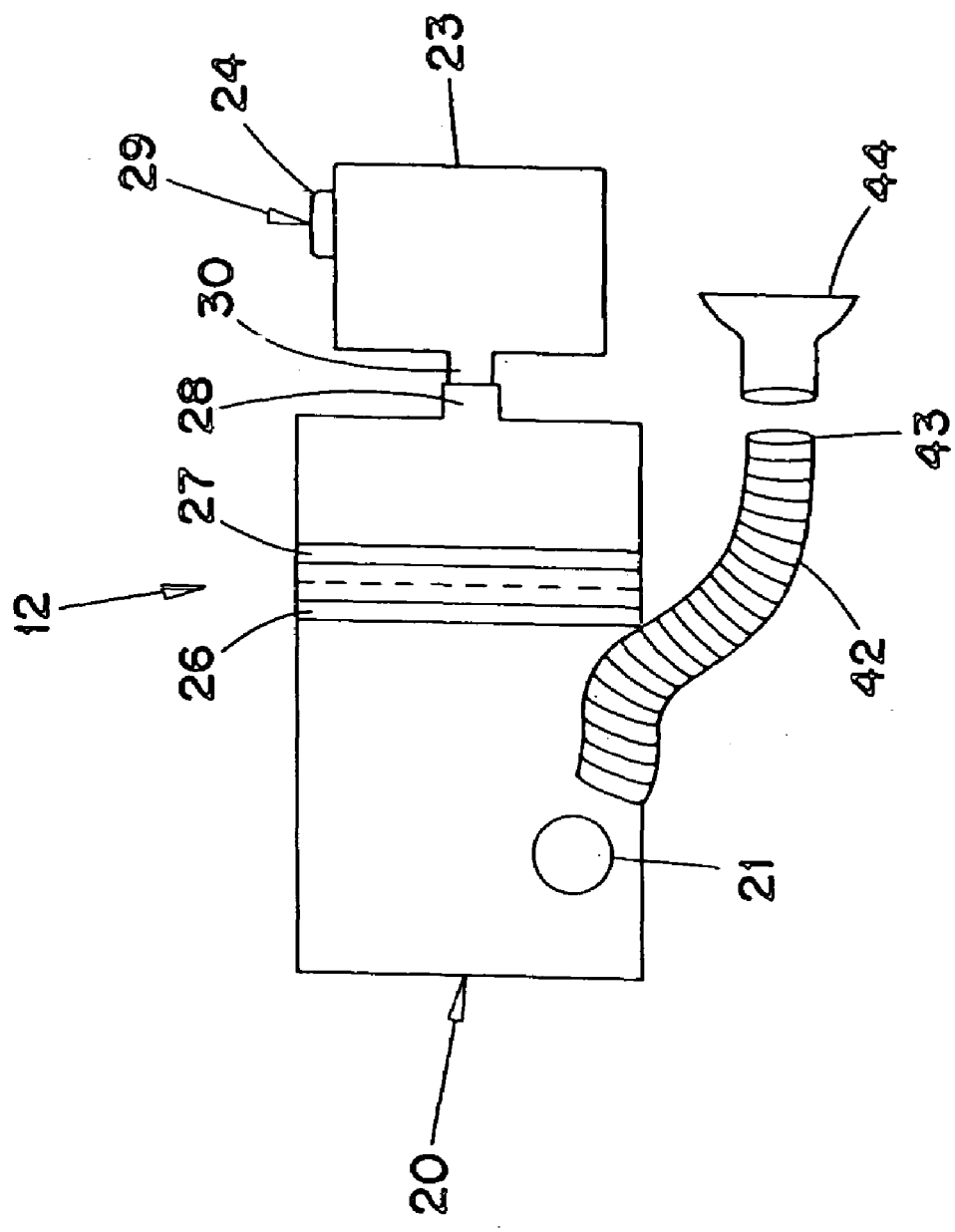
FIG. 8 is an enlarged detail of the bottom side of a vacuum generating unit of the invention.

In FIGS. 7 and 8, vacuum generating unit 12 comprises an electric motor 25, impeller 22 and a removable debris canister 23 that may be directly connected to a vacuum cleaner hose attachment end 24 via vacuum cleaner hose 42 as shown in FIG. 8. Vacuum generating unit 12 also contains a vacuum exhaust port 21 that is located at the opposite end of the vacuum generating unit from debris canister 23 and air input means 29 that may be connected to vacuum cleaner hose 42 with attachment end 24 as shown in FIG. 8. As in all the embodiments, vacuum cleaner hose 42 may be stored in the trunk or boot of the vehicle until it is needed for use.

As is evident in the originally filed drawings (FIGS. 6 to 9), the direct port vacuum cleaning system is for use within a vehicle having a battery. The cleaning system comprises vacuum generating unit 12 including blower means within blower housing 20, and debris canister means having canister housing 23 detachably connected to blower housing 20. The blower means includes rotatably mounted impeller 22, and electric motor means 25 for rotating impeller 22 within blower housing 20. Electric power coupling means electrically connects electric motor means 25 to vehicle battery 10 to rotate the impeller. Blower housing 20 includes air inlet means 28 and air exhaust port 21 that direct a flow of air from air inlet means 28 and out air exhaust port 21 when impeller 22 is rotated within the blower housing.

Debris canister housing 23 includes canister air outlet means 30 that detachably connects the canister housing 23 to air inlet means 28 of blower housing 20. Canister air input means, generally designated 29, receives an input mixture of air and captured debris into debris canister housing 23 when the canister housing is connected to blower housing 20 and impeller 22 rotates. Canister air input means 29 is effective to separate debris from the air input mixture received into canister housing 23, and is further effective to direct air from the air input mixture from canister housing 23 into the flow of air directed from air inlet means 28 and out of air exhaust means 21 of blower housing 20 when impeller 22 is rotated.

In the specific embodiment, canister air input means 29 includes means for removably connecting vacuum cleaner hose attachment end 24 of debris canister 23 or air exhaust means 21 to vacuum hose 42 as shown in FIG. 8. When attached to hose 42, canister air input means 29 receives the input air/debris mixture into debris canister housing 23 in a direction pointing away from canister air outlet means 30 to divert and separate the captured debris from air in the input mixture. So the air goes out of canister air outlet means 30 without carrying debris into the flow of air moving through blower housing 20. Baffle means 31 (FIG. 9) diverts debris from the input mixture, and includes a downwardly curved extension section of canister air input means 29 to direct the captured debris to a bottom portion of canister housing means 23.

And as is further evident, canister housing means 23 has a vertically disposed longitudinal axis extending between a top end and a bottom end of canister housing means 23. And canister air outlet means 30 is located at a first intermediate location between its top and bottom ends with canister air input means being located at a second intermediate location between the top and bottom ends. As shown, the first intermediate location is closer to the canister bottom end than its top end, and the second intermediate location is closer to the canister top end than its bottom end. Moreover, canister air input means 29 is effective to receive the input air/debris mixture into canister housing means 23 along a first direction that extends through the canister longitudinal axis, and canister air outlet means 30 is effective to discharge air from canister housing means 23 along a second direction that extends through its longitudinal axis. A evident in the drawings, the first and second directions are further transverse with respect to each other and disposed at an angle with respect to each other to enhance diversion of the captured debris from the air/debris input mixture. In this specific embodiment, the first and second directions are disposed at an angle of about 90° with respect to each other.

Figure 9:
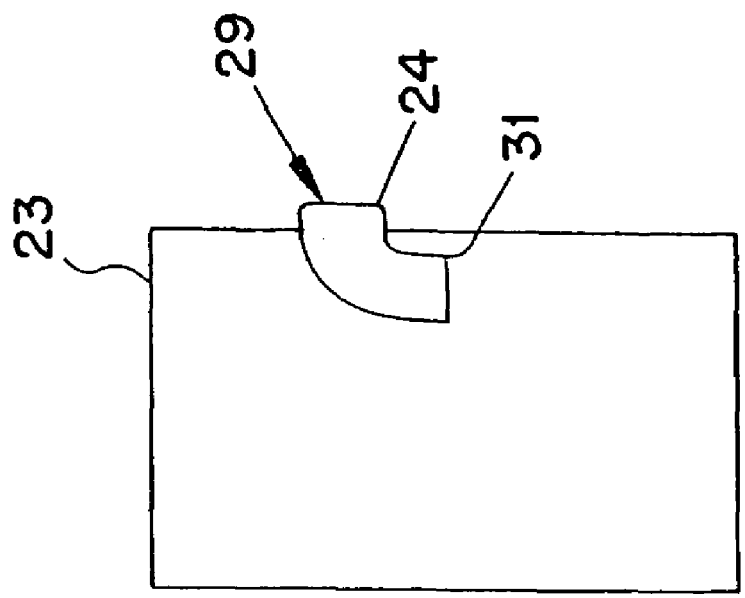
FIG. 9 is a cross-sectional view of a debris canister of a vacuum generating unit of the invention.

Vacuum hose 42 may be directly and detachably connected to debris canister 23 as discussed above. There is direct port intake of debris through air input means 29 into debris canister 23. As shown in FIG. 9, baffle means 31 provides for the debris to be diverted to the bottom of debris canister 23. Debris may include both solid and liquid waste. In a specific embodiment, baffle means 31 is a downwardly directed interior, curved extension of vacuum cleaner hose 42 when removably connected with attachment end 24. Debris canister 23 is easily detached from blower housing 20 and emptied. It is connected to the rest of the vacuum generating unit by conventional means.

In a specific embodiment when hose 42 is connected to vacuum exhaust port 21, it permits the vacuum cleaning system to function as a blower device. In the embodiment shown in FIG. 8, the vacuum exhaust port 21 is located on the bottom of vacuum generating unit 12. Attachment 44 may be connected to hose 42 thus permitting blow drying hair ; blowing sand off kids or dogs; blowing dirt and dust off tools; inflating inner tubes, rafts, and rubber boats; and inflating flat tires and the like. Any old and well known attachment tools of those commonly used with blowers may be used with the present invention.

The vacuum generating unit is located within the vehicle. In a specific embodiment shown in FIG. 6, vacuum generating unit 12 and hose may be located in the back side panel of an automobile or the back cab of a sport utility vehicle. Dimensions of the vacuum generating limit 12 may vary, depending on the space available and according to the needs of the user. In a specific embodiment, vacuum generating unit 12 has a vertical measurement of approximately twelve to fourteen inches and a horizontal measurement of approximately eight to twelve inches. The general appearance of the system is in the shape of perpendicular rectangles. Debris canister 23 is a horizontal rectangle whereas the rest of the unit is vertical. As shown in FIG. 7, impeller 22 is encased by front mounting 27 and back mounting 26. The mountings and positioning of impeller Vacuum cleaner hose 42 comprises a flexible material as shown with a vacuum port attachment end and an attachment tool end 43. The flexible vacuum hose may be of the expandable and retractable type and may be stored in the vehicle. A vacuum cleaner hose attachment tool 44 may be attached to tool end 43 of vacuum cleaner hose 42. Any old and well known attachment tools of those commonly used with vacuum cleaners may be used with the present invention.

With respect to the above description then, it is to be realized that the optimum dimensional relationships for the parts of the invention include variations in size, materials, shape, form, function, manner of operation, assembly, and in use are deemed readily apparent and obvious to one skilled in the art and all equivalent relationships to those illustrated in the drawings and described in the specification are intended to be encompassed by the present invention.

Therefore, the foregoing is considered as illustrative only of the principles of the invention. Those skilled in the art will appreciate that the conceptions upon which this disclosure is based may readily be used for designing other structures, methods, and systems for carrying out the several purposes of the present invention. Since numerous modifications and changes will readily occur to those skilled in the art, the invention is not limited to its exact construction and operation shown and described. It is important, therefore, that the claims be regarded as including such equivalent constructions insofar as they do not depart from the spirit and scope of the present invention.

I claim:

1. A direct port vacuum cleaning system for use within a vehicle having a battery, said cleaning system comprising:
  a) a vacuum cleaner housing including a structural configuration to fit within a vehicle, said vacuum cleaner housing including vacuum generating means disposed therein,
  b) said vacuum cleaner housing with said vacuum generating means being disposed between the outer shell of the vehicle body and an inner surface panel inside the vehicle,
  c) said vacuum generating means including blower means within a blower housing, and debris canister housing means having air outlet means for detachably directly connecting to blower air inlet means of the blower housing for providing a defined path for a flow of air through the system, said debris canister housing means including air input means for directly, detachably attaching a direct port vacuum cleaner hose to direct an air/debris mixture into said debris canister housing means when using the vacuum generating means for cleaning debris from the vehicle,
  d) said blower means including rotatably mounted impeller means, and electric motor means for rotating the impeller means within the blower housing, and
  e) electric power coupling means for electrically connecting said electric motor means to said vehicle battery to rotate said impeller means,
  f) said blower housing including air exhaust means for directing said flow of air from said blower air inlet means and out said air exhaust means of the blower housing when the impeller means is rotated within said blower housing,
  g) said canister air input means being effective to separate said debris from said air/debris mixture received into the canister housing means.

2. A direct port vacuum cleaning system for use within a vehicle having a battery, said cleaning system comprising:
  a) a vacuum cleaner housing including a structural configuration to fit within a vehicle said vacuum cleaner housing including vacuum generating means disposed therein,
  b) said vacuum cleaner housing with said vacuum generating means being disposed within the back cushion of a seat within said vehicle,
  c) said vacuum generating means including blower means within a blower housing, and debris canister housing means having air outlet means for detachably directly connecting to blower air inlet means of the blower housing for providing a defined path for a flow of air through the system, said debris canister housing means including air input means for directly, detachably attaching a direct port vacuum cleaner hose to direct an air/debris mixture into said debris canister housing means when using the vacuum generating means for cleaning debris from the vehicle,
  d) said blower means including rotatably mounted impeller means, and electric motor means for rotating the impeller means within the blower housing, and
  e) electric power coupling means for electrically connecting said electric motor means to said vehicle battery to rotate said impeller means, f) said blower housing including air exhaust means for directing said flow of air from said blower air inlet means and out said air exhaust means of the blower housing when the impeller means is rotated within said blower housing, g) said canister air input means being effective to separate said debris from said air/debris mixture received into the canister housing means.

3. A direct port vacuum cleaning system for use within a vehicle having a battery, said cleaning system comprising:

a) a vacuum cleaner housing including a structural configuration to fit within a vehicle said vacuum cleaner housing including vacuum generating means disposed therein, b) said vacuum cleaner housing with said vacuum generating means being disposed within a cabinet located between two laterally spaced, side-by-side seats in said vehicle, c) said vacuum generating means including blower means within a blower housing, and debris canister housing means having air outlet means for detachably directly connecting to blower air inlet means of the blower housing for providing a defined path for a flow of air through the system, said debris canister housing means including air input means for directly, detachably attaching a direct port vacuum cleaner hose to direct an air/debris mixture into said debris canister housing means when using the vacuum aeneratina means for cleaning debris from the vehicle.

d) said debris canister housing means including baffle means for diverting debris from the air/debris mixture and said debris canister air inlet means being effective to receive said input air/debris mixture into said canister housing means alone a first direction, and said canister air outlet means being effective to discharge air from said canister housing means along a second direction, said first and second directions are disposed at an angle with respect to each other to enhance diversion of the captured debris from the air/debris input mixture) to separate said debris from said air/debris mixture received into the canister housing means, e) said blower means including rotatably mounted impeller means, and electric motor means for rotating the impeller means within the blower housing, and f) electric power coupling means for electrically connecting said electric motor means to said vehicle battery to rotate said impeller means, g) said blower housing including air exhaust means for directing said flow of air from said blower air inlet means and out said air exhaust means of the blower housing when the impeller means is rotated within said blower housing, h) said blower air exhaust means being effective for directly. detachably attaching said direct 4. A direct port vacuum cleaning system as defined in claim 1 wherein said air exhaust means includes a rigid tube that extends through said vacuum cleaner housing and outwardly from said vehicle.

5. A direct port vacuum cleaning system as defined in claim 1 wherein said air exhaust means includes a rigid tube that extends through and outwardly from said vacuum cleaner housing into said vehicle.

6. A direct port vacuum cleaning system as defined in claim 1 wherein said canister housing means is composed of rigid, air impermeable material.

7. A direct port vacuum cleaning system as defined in claim 2 wherein said air exhaust means includes a rigid tube that extends through said vacuum cleaner housing and outwardly from said vehicle.

8. A direct port vacuum cleaning system as defined in claim 2 wherein said air exhaust means includes a rigid tube that extends through and outwardly from said vacuum cleaner housing into said vehicle.

9. A direct port vacuum cleaning system as defined in claim 4 wherein said air exhaust means includes a rigid tube that extends through said vacuum cleaner housing and outwardly from said vehicle.

10. A direct port vacuum cleaning system as defined in claim 3 wherein said air exhaust means includes a rigid tube that extends through and outwardly from said vacuum cleaner housing into said vehicle.

11. A direct port vacuum cleaning system as defined in claim 2 wherein said canister housing means is composed of rigid, air impermeable material.

12. A direct port vacuum cleaning system as defined in claim 3 wherein said canister housing means is composed of rigid, air impermeable material.

* * * * *